United States Patent
Dishon et al.

(10) Patent No.: US 10,121,294 B1
(45) Date of Patent: Nov. 6, 2018

(54) RAPID DOCUMENT DETECTION AND IDENTIFICATION

(71) Applicant: Raytheon BBN Technologies Corp., Cambridge, MA (US)

(72) Inventors: John Dishon, San Diego, CA (US); Joshua N. Edmison, Ellicott City, MD (US); John-Francis Mergen, Baltimore, MD (US); Zachary Leuschner, Annapolis, MD (US); Kerry Wood, Elkridge, MD (US); Laurie Waisel, Columbia, MD (US); Richard Burne, Ellicott City, MD (US); Tyler Shake, Baltimore, MD (US); Thomas Wilkerson, Baltimore, MD (US); Jason Fox, San Diego, CA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 0 days.

(21) Appl. No.: 15/676,518

(22) Filed: Aug. 14, 2017

(51) Int. Cl.
*G07C 9/00* (2006.01)
*G06K 19/10* (2006.01)
*G06K 9/00* (2006.01)

(52) U.S. Cl.
CPC ..... *G07C 9/00007* (2013.01); *G06K 9/00463* (2013.01); *G06K 19/10* (2013.01)

(58) Field of Classification Search
CPC .......... G06K 19/10; G06K 7/086; G06K 9/00; G06K 9/00463; G07C 9/00007; G07C 9/00031
See application file for complete search history.

(56) References Cited

U.S. PATENT DOCUMENTS 9,740,975 B2 * 8/2017 Gibson ............. G06K 19/0672
2010/0097187 A1 * 4/2010 Hill .................. G06K 19/0707
340/10.1

(Continued)

OTHER PUBLICATIONS

U.S. Appl. No. 15/259,760, filed Sep. 8, 2016, Apparatus and Method for Remote Analysis of a Target Device.

(Continued)

*Primary Examiner* — Carlos E Garcia
(74) *Attorney, Agent, or Firm* — Schwegman Lundberg & Woessner, P.A.

(57) ABSTRACT

An apparatus, method, and computer program product that intentionally illuminate at least one target item with electromagnetic energy having specific characteristics (e.g., frequency, power, waveform, directionality, duration, etc.). The target item, which may be an unpowered data storage device or secure document, acts as a non-linear mixer and is forced to emit radiative signals containing information about the target item's state and physical characteristics. Embodiments receive the forced emissions, extract useful data, and analyze the data to determine target item characteristics (e.g., a target item type, based on a comparison of data from known types). Embodiments control the illumination so the forced emissions radiate from an enclosure without interfering with tactical communications, and so that stored target item data is not affected. Embodiments can locate a hidden target item via the strength and directionality of the forced emissions. The apparatus is portable for use by military, intelligence, and security personnel.

20 Claims, 7 Drawing Sheets

(56) References Cited

U.S. PATENT DOCUMENTS

| | | | | |
|---|---|---|---|---|
| 2011/0061605 | A1* | 3/2011 | Hardi | A01K 15/021 |
| | | | | 119/721 |
| 2015/0102105 | A1* | 4/2015 | Perret | G06K 19/06046 |
| | | | | 235/440 |
| 2016/0013657 | A1* | 1/2016 | Jeong | H02J 7/0044 |
| | | | | 307/104 |
| 2017/0288788 | A1 | 10/2017 | Dishon et al. | |
| 2017/0288789 | A1 | 10/2017 | Dishon et al. | |
| 2017/0289786 | A1 | 10/2017 | Dishon et al. | |

OTHER PUBLICATIONS

U.S. Appl. No. 15/375,834, filed Dec. 12, 2016, Automated Avionics Testing.

U.S. Appl. No. 15/362,121, filed Nov. 28, 2016, Apparatus and Method for Rapid Electronic Device Discovery.

"GNU Radio Website", WaybackMachine: www.gnuradio.org, (Nov. 2015), 4 pgs.

"NSA TEMPEST Documents", [Online]. Retrieved from the Internet: <URL: https://cryptome.org/nsa-tempest.htm>, (Accessed Oct. 30, 2015), 2 pgs.

"Ramsey RF Shielded Test and Forensics Enclosures", Ramseytest. com—Nov. 2015, (Oct. 26, 2015), 2 pgs.

Agrawal, Dakshi, et al., "Multi-channel Attacks", Cryptographic Hardware and Embedded Systems—CHES 2003, vol. 2779, (2003), 2-16.

Agrawal, Dakshi, et al., "The EM Side-Channel(s)", Cryptographic Hardware and Embedded Systems—CHES 2002, vol. 2523, (2002), 29-45.

Agrawal, Dakshi, et al., "The EM Side-Channel(s): Attacks and Assessment Methodologies", Proceedings of the 4th International Workshop on Cryptographic Hardware and Embedded Systems, (2002), 1-42.

Batina, Lejla, et al., "Mutual Information Analysis: A Comprehensive Study", J. Cryptol., vol. 24, No. 2, (Apr. 2011), 269-291.

Bayrak, Ali, et al., "First Step Towards Automatic Application of Power Analysis Countermeasures", Proceedings of the 48th Design Automation Conference, (2011), 230-235.

Callan, Robert, et al., "A Practical Methodology for Measuring the Side-Channel Signal Available to the Attacker for Instruction-Level Events", Proceedings of the 47th Annual IEEE/ACM International Symposium on Microarchitecture (MICRO), (Dec. 2014), 242-254.

Callan, Robert, et al., "Comparison of Electromagnetic Side-Channel Energy Available to the Attacker from Different Computer Systems", IEEE International Symposium on Electromagnetic Compatibility (EMC) (2015), 219-223.

Callan, Robert, et al., "FASE: Finding Amplitude-modulated Side-channel Emanations", Proceedings of the 42Nd Annual International Symposium on Computer Architecture, (2015), 592-603.

Clark, Shane, "The Security and Privacy Implications of Energy-Proportional Computing (Dissertations. Paper 782)", University of Massachusetts Amherst, (2013), 125 pgs.

Compston, James, et al., "A Fundamental Limit on Antenna Gain for Electrically Small Antennas", IEEE 2008 Sarnoff Symposium, (2008), 1-5.

Cui, Ang, "A Quantitative Analysis of the Insecurity of Embedded Network Devices: Results of a Wide-Area Scan", Proceedings of the 26th Annual Computer Security Applications Conference, (2010), 97-106.

Dasilva, Luiz, et al., "Requirements of an Open Platform for Cognitive Networks Experiments", 3rd IEEE Symposium on New Frontiers in Dynamic Spectrum Access Networks, (2008), 1-8.

Del Pozo, Santos, et al., "Blind Source Separation from Single Measurements Using Singular Spectrum Analysis", Cryptographic Hardware and Embedded Systems—CHES 2015, vol. 9293, (2015), 42-59.

Dysart, Paul, et al., "Regional Seismic Event classification at the NORESS array: Seismological Measurements and the Use of Trained Neural Networks", Bull. Seismol. Soc. Am., vol. 80, No. 6B, (Dec. 1990), 1910-1933.

Flintoff, Ian D., et al., "The Re-Emission Spectrum of Digital Hardware Subjected to EMI", IEEE Transactions on Electromagnetic Compatibility, vol. 45, No. 4 (Nov. 2003), 11 pgs.

Gandolfi, Karine, et al., "Electromagnetic Analysis: Concrete Results", Cryptographic Hardware and Embedded Systems—CHES 2001, vol. 2162, (2001), 251-261.

Gierlichs, Benedikt, et al., "Mutual Information Analysis: A Generic Side-Channel Distinguisher", Cryptographic Hardware and Embedded Systems—CHES 2008, vol. 5154, (2008), 426-442.

Hastie, T, et al., "", The Elements of Statistical Learning, Springer New York, (2009), 763 pgs.

Kim, Tae Hyun, et al., "Side channel analysis attacks using AM demodulation on commercial smart cards with SEED", The Journal of Systems and Software 85 (12), (Dec. 2012), 2899-2908.

Knight, John, et al., "Automated Classification of Active Acoustic Returns", Radix Systems, Inc., (Apr. 9, 1993), 16 pgs.

Kocher, Paul, et al., "Introduction to differential power analysis", J. Cryptogr. Eng., vol. 1, No. 1, (Apr. 2011), 5-27.

Kuhn, Markus, "Security Limits for Compromising Emanations", Cryptographic Hardware and Embedded Systems—CHES 2005, vol. 3659, (2005), 265-279.

Lakshminarayanan, Kaushik, et al., "RFDump: An Architecture for Monitoring the Wireless Ether", Proceedings of the 5th International Conference on Emerging Networking Experiments and Technologies, (2009), 253-264.

Li, Huiyun, et al., "Security Evaluation Against Electromagnetic Analysis at Design Time", Cryptographic Hardware and Embedded Systems—CHES 2005, vol. 3659, (2005), 280-292.

Meynard, Olivier, et al., "Enhancement of Simple Electro-Magnetic Attacks by Pre-characterization in Frequency Domain and Demodulation Techniques", Design, Automation Test in Europe Conference Exhibition, (2011), 1-6.

Montminy, D P, "Enhancing Electromagnetic Side-Channel Analysis in an Operational Environment (Dissertation)", Air Force Institute of Technology, (Sep. 2013), 247 pgs.

Muccioli, J P, et al., "Characterization of the RF Emissions from a family of microprocessors using a 1 GHz TEM cell", IEEE 1997 International Symposium on Electromagnetic Compatibility, (1997), 203-207.

Muccioli, J P, et al., "Investigation of the theoretical basis for using a 1 GHz TEM cell to evaluate the radiated emissions from integrated circuits", IEEE 1996 International Symposium on Electromagnetic Compatibility, 1996. Symposium Record., (1996), 63-67.

Oliphant, T. E., "Python for Scientific Computing", Comput. Sci. Eng., vol. 9, No. 3, (May 2007), 10-20.

O'Shea, Timothy, et al., "Practical Signal Detection and Classification in GNU Radio", SDR Forum Technical Conference, (2007), 6 pgs.

Pedregosa, F, et al., "Scikit-learn: Machine Learning in Python", J Mach Learn Res, vol. 12, (Nov. 2011), 2825-2830.

Peeters, Eric, et al., "Power and electromagnetic analysis: Improved model, consequences and comparisons", Integr. VLSI J., vol. 40, No. 1, (Jan. 2007), 52-60.

Pulli, Jay, "Analysis of the Jan. 2015 Plainfield, CT Earthquake Sequence Using Waveform Correlation Techniques", Presented at the 87th Annual Meeting Eastern Section Seismological Society of America, University of Memphis., (Oct. 7, 2015), 18 pgs.

Pulli, Jay, "Instantaneous Power Calculations for the Patrick Alpha Acoustic Projector", Analysis Staff Technical Memorandum, (Sep. 5, 1989), 19 pgs.

Quisquater, J J, et al., "ElectroMagnetic Analysis (EMA): Measures and Counter-measures for Smart Cards", Smart Card Programming and Security, vol. 2140, (2001), 200-210.

Sarihari, Mohd Adib, et al., "Energy Detection Sensing based on GNU Radio and USRP: An Analysis Study", IEEE 9th Malaysia International Conference on Communications (MICC), (2009), 338-342.

Sharan, Ravi, et al., "The Comprehensive GNU Radio Archive Network", [Online]. Retrieved from the Internet: <URL: http://www.cgran.org/ >, (Nov. 2015), 5 pgs.

Van Der Walt, S, et al., "The NumPy Array: A Structure for Efficient Numerical Computation", Comput. Sci. Eng., vol. 13, No. 2, (Mar. 2011), 22-30.

(56) References Cited

OTHER PUBLICATIONS

Vick, Ralf, et al., "The Dependence of the Immunity of Digital Equipment on the Hardware and Software Structure", (1997), 383-386.

Vuagnoux, Martin, et al., "An Improved Technique to Discover Compromising Electromagnetic Emanations", IEEE International Symposium on Electromagnetic Compatibility (EMC),, (2010), 121-126.

Vuagnoux, Martin, et al., "Compromising Electromagnetic Emanations of Wired and Wireless Keyboards", USENIX security symposium, (2009), 1-16.

Zajic, Alenka, et al., "Experimental Demonstration of Electromagnetic Information Leakage from Modern Processor-Memory Systems", IEEE Trans. Electromagn. Compat., vol. 56, No. 4, (Aug. 2014), 885-893.

* cited by examiner

FIG. 1

FIG. 2
OUTPUT POWER VERSES FREQUENCY, SHOWING FNLE

FIG. 3
EXPERIMENTAL SETUP

RAPID DOCUMENT DETECTION AND IDENTIFICATION

GOVERNMENT RIGHTS

This invention was made with Government support under Contract Number FA8750-16-C-7627. The Government has certain rights in this invention.

RELATED APPLICATIONS

This application is related by subject matter to the following applications, which are each incorporated by reference in its entirety: U.S. Ser. No. 15/362,121 entitled "Apparatus And Method For Rapid Electronic Device Discovery", filed on Nov. 28, 2016, and U.S. Ser. No. 15/259,760 entitled "Apparatus And Method For Remote Analysis Of A Target Device", filed on Sep. 8, 2016, which claims the priority benefit of provisional application U.S. Ser. No. 62/316,913 entitled "Forced Non-Linear Emissions", filed on Apr. 1, 2016.

TECHNICAL FIELD

Embodiments pertain to measurement and signal intelligence (MASINT). Some embodiments pertain to the apparatus and methods for, and the data obtained from illuminating target items with intentional radio frequency (RF) energy and observing resulting responses.

BACKGROUND

Over at least the past thirty-five years there has been a continuing interest in the ability to detect and identify particular types of items, such as high-value documents, from afar. A number of methods of item detection have been explored, including visible light examination, magnetic sensing, multispectral analysis, and detection of responses from radio frequency identification (RFID) tags. All of the previous methods have been limited in a combination of precision, range, and general applicability. Known methods for observing target item characteristics require some knowledge of target item behaviors, which may be deliberately designed, and/or close physical access to the target item. Current and past techniques thus require substantial a priori knowledge.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, that particular improvements of the apparatus and methods used for detecting and identifying remotely located target items, such as documents, are possible and would enable specific distinct advantages.

The inventive examples described below may address the shortcomings of previous efforts and enable advantageous remote sensing and characterization of a target item. This disclosure describes systems and methods for characterizing, observing, and measuring target items from a standoff distance limited only by the ability to place RF energy on the target items and properties of the target items. The solutions provided require no a priori knowledge of target items, may be tailored to avoid impacting target item operation and data storage, and do not require physical access to the target item. The disclosed examples leverage the analog properties of a target item to extract useful information about the target item.

The examples described make novel use of involuntary analog emissions from all classes of target items to enhance detection and identification. This approach may exploit the signal content of forced electromagnetic (EM) emissions from illuminated target items. The non-linear properties of the forced emissions enable circumvention of shielding. The solution provided thus enables assessment of many heterogeneous target items remotely and efficiently.

The exemplary apparatus may comprise illumination devices or transmitter circuits for producing electromagnetic energy, and receiver devices or circuits for receiving forced emissions. The methods may extract the key re-emission signals from noise, and analyze the resulting signal data for identifying indicia. The data obtained may enable defense contractors to assess reemission characteristics of sensitive documents, allow civilian consumers to monitor their home items, and enable businesses to monitor their enterprises. Similarly, target items may be detected, located, and characterized by military, security, and intelligence personnel more rapidly and thoroughly than is possible via visual inspection alone.

Figure 1:
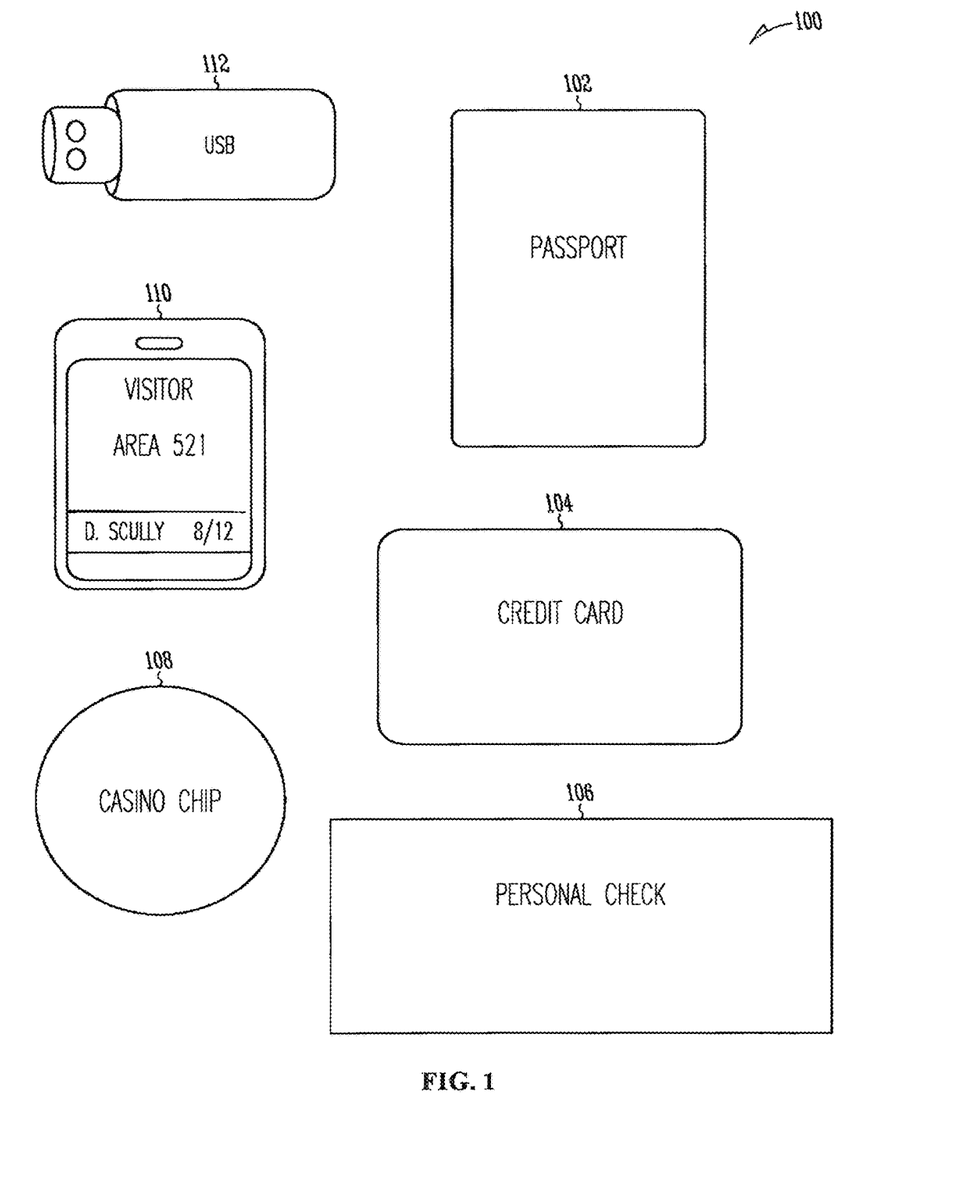
FIG. 1 shows examples of target items 100 in accordance with some embodiments.

FIG. 1 shows examples of a target item 100 in accordance with some embodiments. In these examples, the target items 100 include a passport 102, a credit card 104, a bank check 106, a gambling chip 108, an ID badge/cardkey 110, and a flash memory device 112. The disclosure is not limited in this respect, however, as many other types of items may also be investigated via the forced emission approach.

Electromagnetic energy may be injected into the target item 100 through various channels. If the target item 100 contains electronic components that are intended to provide data to an outside reader through a given channel, the electromagnetic energy may be injected via such a channel. In the examples shown, credit card 104 may include a smartcard that is designed to be powered to produce or process a nonce as part of a security protocol during a purchase. The flash memory device 112 may store data without power until it is connected to a computing device, at which time the stored data may be read, deleted, or overwritten. The electromagnetic energy may be injected into such a target item 100 to cause its normal operational signals to mix and produce forced non-linear emissions. The passport 102, gambling token 108, and ID badge/cardkey 110 for example, may also include circuitry, though this circuitry may exist specifically to cause very particular forced non-linear emissions as with an RFID tag.

The present inventors have further recognized that applications of the embodiments provided are not limited to powered, operational electronic target items 100 as described in the previously-cited related applications. The target item 100 may also comprise an unpowered resonant structure that may absorb and reflect or re-emit radio signals differently as a function of frequency. Each such resonant structure may absorb signals that are deliberately applied via external illumination, or via signals that arrive from other such resonant structures. Multiple such resonant structures may therefore stimulate each other in a single target item 100 with their reflective energies to produce forced non-linear emissions.

Conventional RFID tags are deliberately designed to absorb incoming radio frequency energy and produce a coded radio signal at a single predetermined frequency. In contrast, the resonant structure of target item 100 may be designed to absorb incoming radio frequency energy and produce a response comprising any number of predetermined frequency components, or a response comprising a number of frequency components within a predetermined frequency range, or a response that is not necessarily deliberately designed a priori at all. That is, the target item 100 may be provided with a resonant structure with a precise response behavior that is not known ahead of time nor related to an ongoing operation of a target item 100, but may nonetheless be measured and stored for future comparisons. The response behavior may be changed by the intended use of the target item 100, or by its degradation.

Conventional polymeric security strips are used for example in currency notes, but are not designed to resonate at radio frequencies. Detection, identification, and analysis of secure documents containing embedded security strips that resonate electromagnetically may be particularly a useful application of FNLE technology. The security strips may comprise polymer ribbons or fibers of a particular width and/or thickness that may include electrically conductive regions of a particular length. The conductive regions may comprise metallic wire or metallic coatings or metallic inks, for example.

Each such security strip with a conductive portion may thus comprise a resonant structure capable of being forced to emit non-linear emissions. These secure documents may be generally of higher value than ordinary documents, for example, to offset the increased cost of such security technology. Secure documents including such resonant security strips may comprise deeds, bank checks, credit cards, ID badges/cardkeys, passports, college degrees, software licenses, bonds such as bearer bonds, driver's licenses, currency notes including marked bills used for criminal investigation, and classified or confidential reports, though the present invention is not limited to such illustrative examples.

A secure document like the bank check 106 or the passport 102 for example may be manufactured with electromagnetically resonant security strips embedded in their paper substrates. That is, the paper of the document itself may incorporate any number of conductive resonant structures that either reflect radio frequency energy, or resonate at a frequency different than the input radio frequency energy, or both. The secure document may therefore output forced non-linear emissions in response to the intentionally applied external RF illumination. The emissions may be induced directly by the external RF illumination, or may occur in response to signals emitted from resonant structures such as other security strips that may have different frequency responses. The end result is the production of forced non-linear emissions that then radiate away.

Other embedded resonant structures may perform a similar function. For example, the familiar security hologram manufactured into credit card 104 may be placed on top of or be replaced with a resonant structure that is designed to provide an electronic assurance that the credit card 104 is genuine. Such an embedded resonant structure may comprise a patterned electrically conductive film, wherein carefully engineered shapes and/or voids in the conductive film may define resonance cavities that may be excitable to produce forced non-linear emissions. It is even possible that existing security holograms already produce a distinctive forced non-linear signal, and that such properties have simply not been recognized until now. A credit card reader could thus interrogate the credit card 104 or other similar target item 100 not only via an embedded smartcard but also via the forced non-linear signals emitted from the embedded security resonator structures described.

The electromagnetically resonant behavior of such target items 100 may be known at the time of manufacture, based on the design of embedded security structures as described, but the present invention is not so limited. A resonant structure may also be printed onto or otherwise attached to a surface of target device 100. For example, a bar code or QR code comprising electrically conductive ink may provide a particular radio frequency resonance pattern in addition to its conventional optical pattern.

A comparison of the information gathered optically against the information gathered via FNLE may help confirm that the target device 100 bears the indicia it should to be genuine. The fact that the FNLE are being emitted and analyzed need not even be revealed, to help preserve knowledge of the possibility of such a consistency check. That is, an optical code may be printed on the target item 100 in conventional black ink, while the electrically conductive code may be printed in conductive black ink only within selected areas of those black ink portions so they remain unnoticed on visual inspection.

The resonant behavior of target items 100 having printed resonant structures may also be customized for a particular person at the time of manufacture. In one embodiment, the printing on a bank check 106 that defines the particular bank customer and/or account number may comprise a conductive ink pattern that resonates distinctively when RF electromagnetic radiation is provided to such a target item 100 and/or to other resonant structures that a target item 100 contains. The detected pattern of such FNLE may therefore be unique to that particular customer's checks, and even to checks that correspond to a particular account number. The FNLE pattern may not be specifically designed or known at the time of manufacture in such cases, but instead may result from the deliberate printing on the target item 100, and may be recorded for future comparisons against other such target items 100.

The resonant behavior of target items 100 may also be determined by the application of conductive ink during the actual intended use of the target items 100. For example, a visa stamp placed into the passport 102 by an immigration security officer could form a pattern of conductive ink that has a known and recognizable radio frequency resonance pattern. Another immigration security officer could therefore scan the passport 102 electromagnetically to determine from its recognized FNLE pattern if a given visa stamp from a given country exists in the passport 102. Embedded resonant structures may be required to properly excite the printed ink pattern structures.

Similarly, a user of a target item 100 may personally customize the target item 100 by depositing conductive ink or by disrupting existing conductive ink patterns. The depositing may occur when a user for example writes a manual signature or other writing onto a target item 100 using conductive ink. The deposition of conductive ink could also connect predefined security structures, which may also made from the conductive ink, to form a particular electrically resonant structure. That is, the pattern resulting from both the predefined and manually provided conductive ink may define a particular FNLE pattern. The unique deposition of conductive ink by a user could by itself also create an entirely arbitrary pattern of FNLE. Such an arbitrary but discernible pattern could be useful in recognizing a particular target item 100.

The disrupting of the existing conductive ink patterns could occur when a user for example breaks a brittle resonator layer, causing the FNLE to change in detectable ways. The change in the FNLE may be effectively irreversible. Such disruption may therefore serve as an indicator that the conductive ink pattern has undergone a discernible (though in this case deliberate) degradation.

Detection of such degradation may be of particular utility in security related applications. For example, a layer of conductive ink may be printed onto a target item 100 in a large relatively featureless pattern or coating that may not produce a very strong or complex FNLE. As the printed layer degrades, e.g., due to temperature, humidity, vibration, wear, cracking, and/or splitting of layers of such a printed resonator structure, the forced non-linear emission may change notably. This degradation may indicate that the target item 100 is no longer reliable, either in terms of its security features or other functionality.

A wide variety of target items 100 may therefore be securely identified via electromagnetically resonant security features that are embedded or printed or manually attached thereto. For example, works of art, auto parts, firearms, cigarette packages, secure containers, items of clothing, computers, cell phones, shoes, packaged integrated circuits, pharmaceuticals, and uniforms (e.g., military, security, prisoner) each may have resonant security features that produce distinctive, recognizable FNLE. The security features may be made visually prominent, as a deterrent for example, or they may be kept relatively unobtrusive to avoid easy visual detection by persons who are unfamiliar with their existence. Note, the external RF illumination and the induced responses are each of sufficiently low power that there are no health risks to any persons in the area being illuminated.

Figure 2:
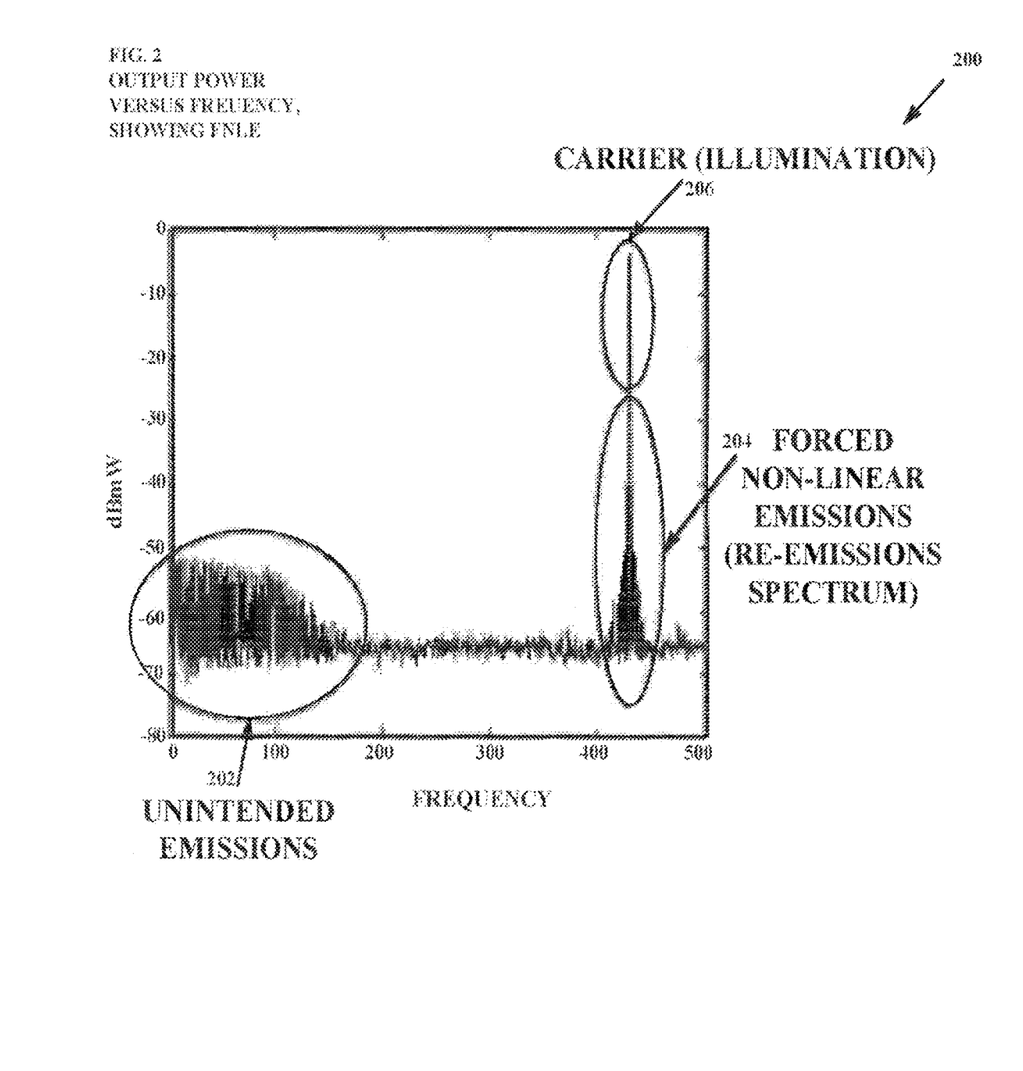
FIG. 2 shows an example of a spectrum 200 of emitted electromagnetic power versus frequency emitted by a target item in accordance with some embodiments.

FIG. 2 shows an example of a spectrum 200 of emitted electromagnetic power versus frequency emitted by a target item 100 in accordance with some embodiments. At the lower end of the frequency range, a variety of unintended emissions 202 are shown. When illuminated with RF energy, electronic devices and other resonant structures may emit forced non-linear emissions (FNLE), also described as the re-emission spectrum 204. The non-linear emissions 204 may be the result of superheterodyne-like mixing of any normal operating signals or cross-resonant signals with the externally applied illumination. The large peak shown represents the carrier wave 206 of the intentional illumination signal. Around the large peak, the re-emission spectrum of the forced non-linear emissions 204 is shown. In general, the re-emission spectrum 204 manifests as sidebands around a carrier frequency, and is largely dependent upon the physical characteristics of the target item 100. The re-emission spectrum 204 may contain considerable information about the interaction of the illuminating RF energy and the target item 100.

The examples provided may illuminate a target item 100 with RF waveforms swept across a broad range of frequencies. Illuminating a target item generates mixed signal products, e.g., signals resulting from the combination of the illumination signal and any existing active on-board target item signals or resonances from even inactive structures. This mixing provides unique signal characterization opportunities that may be exploited by several exemplary and non-limiting embodiments. These opportunities may include:

Increased signal detection range: Illumination may provide a carrier signal that mixes with signals or resonances present in the target item. This interaction may produce a mixed signal, an FNLE 204, with improved signal strength that can be detected at a greater range. Experimental tests suggest that a gain of 50 dB may be expected over operational emissions occurring without illumination. The corresponding improvement in signal-to-noise ratio enables remote sensing improvement goals in various environments. Further, in one example, the forced non-linear emissions 204 may radiate from the target item 100 via an antenna of the target item 100, further increasing the detection range for a given illumination power. The frequency of the illumination energy may be configured to avoid interference with signals that radiate from the target item antenna during normal operation of the target item 100. However, the scope of this disclosure is not limited in this respect.

Increased signal fidelity: Illumination mixing produces a host of new FNLE 204 at new frequencies. These emissions may be unanticipated by the target item's designers and are thus unlikely to be RF shielded or suppressed. The effects of illumination may therefore provide a broader, more complex set of signals for analysis. This wider range of signal information about the target item 100 may aid in the characterization of the target item 100.

Increased information content on the target item's operational state: The cross modulation and intermodulation products within the FNLE 204 generated may have their origins in many parts of the target item 100 that may each resonate. Examples include but are not limited to induced non-linear signals with complex harmonic structures caused by resonances of security strips embedded in documents, security structures attached to a document, and stamps or signatures on a document written in conductive ink. All of these features may produce signatures that when combined denote characteristics underlying the target item 100, e.g., its presence or a count of multiple target items 100 present. It may also be possible to discern the presence of a number of particular instances or types of a component in the target item 100, enabling inventory control and situational awareness through a survey of detected items. The signal data generated by for example software defined radio (SDR) based test pods may be analyzed using non-linear classification and data mining methods to exploit the complex nature of the signal features (e.g., phase and harmonic structures)

to characterize target items 100. The additional signal content available from FNLE 204 may enable desired classification accuracy.

General operational applicability: The excitation mechanism and receivers in one exemplary implementation are an SDR system. SDRs may automatically illuminate target items 100 at multiple frequencies and waveforms to characterize and analyze the target items 100. That is, multiple illumination signals may be applied simultaneously to induce multiple forced non-linear emissions 204. However, the disclosure is not limited in this respect.

The disclosed examples may form the basis of a new security/monitoring capability for protecting secure documents, credit cards, auto parts, flash memories, or similar items by monitoring their behavior at a physical level from a standoff distance. They may also form the basis of a counterfeit detection capability or damage detection capability.

The externally generated illumination may also interact with unpowered target items 100, such as data storage devices, to stimulate and mix with electromagnetic signals in the target items 100. That is, even if there are normally no operational signals actively transferring data, the illumination may nonetheless induce reflective or resonant signals within the target item 100. The mixture of these induced signals with the externally applied electromagnetic energy may produce forced non-linear emissions 204 that also radiate from the unpowered target item 100.

In an example, a software defined radio (SDR) apparatus configured to remotely and automatically detect and analyze a target item 100 may include transmitter circuitry configured to illuminate the target item 100 with electromagnetic energy that stimulates and mixes with electromagnetic signals or resonances in the target item 100, to produce forced non-linear emissions that radiate from the target item 100, and receiver circuitry configured to receive the forced non-linear emissions from the target item 100 for subsequent analysis and evaluation.

In an example, a method of remotely and automatically detecting and identifying a target item 100 may include illuminating the target item 100 using transmitter circuitry that outputs configured electromagnetic energy that stimulates and mixes with electromagnetic signals and resonances in the target item 100, to produce FNLE that radiate from the target item 100, and receiving the FNLE using receiver circuitry for subsequent analysis and evaluation.

In an example, a non-transitory computer-readable storage medium may store instructions for execution by processing circuitry of an SDR that remotely and automatically detects and analyzes a target item 100, to configure the SDR to illuminate the target item 100 using transmitter circuitry that outputs configured electromagnetic energy that stimulates and mixes with electromagnetic signals and resonances in the target item 100, to produce FNLE that radiate from the target item 100, and to receive the FNLE using receiver circuitry for subsequent analysis and evaluation.

Further, the illumination may be controlled to responsively move the FNLE 204 out of a frequency range that is effectively shielded by an enclosure and into a frequency range that more readily escapes the enclosure. Transmitter circuitry may be configured to control the electromagnetic energy by varying at least one of its frequency, power, waveform, directionality, and duration for example to increase the FNLE received. In an embodiment, the frequency ranges of the illumination that provide the clearest data for a variety of commercially available normally-unpowered target items 100 may be determined a priori and stored for use as default settings. Then, when an in situ scan is performed, those illumination frequencies may be used to cause FNLE 204 to radiate and provide useful data for analysis from any such target items 100 present.

The frequency ranges of the illumination that provide the clearest data may also be determined automatically during a scan. If target items 100 are hidden or concealed from view, for example within furniture or in cluttered environments, the illumination may be modified to nonetheless cause clearly discernible FNLE 204 that radiate through intervening materials sufficiently for adequate reception and analysis. Other aspects of the applied electromagnetic energy may also be varied to adapt the system to the local environment, such as its power and directionality as previously noted.

Processing circuitry configured to perform the analysis and evaluation of the FNLE 204 may also locate such hidden target items 100. The strength and directionality of the emissions for example may help guide a user to the target items 100. In one embodiment, a smartphone application may process the FNLE 204 to provide a map of the emission sources based on their strength and directionality.

Such a map may be dynamically overlaid onto a conventional camera-acquired image of a room or other location being scanned for example, to visually highlight the radiative signal sources. Thus, the embodiments described may greatly improve the speed and thoroughness of what has previously been a visual and manual search process. This automated approach to target item 100 detection, location, and identification may reduce the likelihood of human error during a search.

Figure 3:
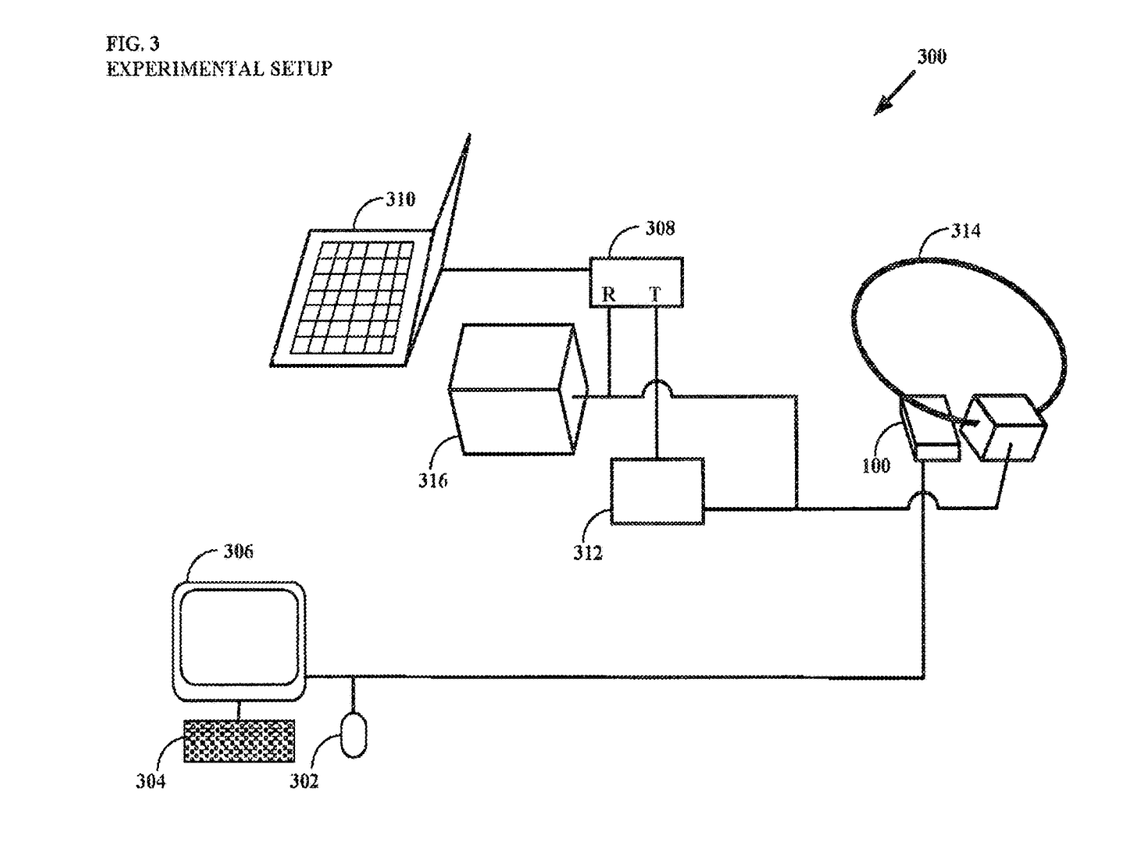
FIG. 3 shows an example of a forced non-linear emission (FNLE) apparatus 300 in accordance with some embodiments.

FIG. 3 shows an example of a forced non-linear emission apparatus 300 in accordance with some embodiments. Although described below in terms of a target item 100 that may have internal operational signals of its own, the apparatus is also operable for target items 100 that do not have internal operational signals. An initial implementation has demonstrated the concept has been reduced to practice. In this example, the target item is a Raspberry Pi® microcomputer, available from the Raspberry Pi Foundation. A mouse 302, keyboard 304, and monitor 306 are connected to the target item 100 to enable a user to control its operations.

A typical illumination apparatus may comprise one or more RF emitters or transmitter circuits positioned at some distance from the target items 100. The distance from the target items 100 may be fixed or variable, enabling operation on a moving platform based on air, sea, or land. Increased proximity to the target items 100 may reduce a required illumination power. One or more RF receiver circuits may also be placed at a distance. Receivers may be placed farther away from the target items 100 than the emitters.

In this example, the receiver circuit and transmitter circuit comprise a software-defined radio transceiver 308, which is capable of operation from 70 MHz to 6 GHz. The transceiver 308 may be controlled for example by a laptop computer 310 that executes a software-defined radio program with an AM demodulator. The output from the transceiver 308 may be fed into a frequency shifter 312, that may for example shift the transmitted signal upward in frequency by 125 MHz to produce an illumination signal. The illumination signal in this example drives a loop antenna 314, which may be driven directly as a transmitting antenna and also tuned over a receiving frequency range of 650 kHz to 4.8 MHz by loop antenna tuning capacitor 316 to serve as a receiving antenna, for simplicity. The loop antenna 314 is shown suspended over the target item 100 by several inches, but the disclosure is not limited in this respect.

A production version of the apparatus 300 may be battery operated and portable, so that a single person may readily transport and deploy it as a single "black box" in essentially any environment. Typical users may comprise military, security, or intelligence personnel.

In another example, Special Forces operators may be assigned to locate and seize secure documents or small, possibly hidden, and possibly unpowered electronic devices or secure documents during a covert mission. Such users may deploy the apparatus 300 in a terrorist compound or other tactical environment, to sweep the location with electromagnetic energy to assist with the search for an adversary's target items 100. At present, such searches are generally manual and visual, and therefore time-consuming, risky, and haphazard.

In modern anti-terrorist or other security operations, soldiers are often asked to not only find target items 100 by hand, but to also simultaneously protect themselves and their units from enemy fire. The apparatus 300 may therefore automatically scan the area with RF energy in spectra known or adaptively determined to cause FNLE 204 from target items 100. The apparatus 300 may operate without significant delay, while the soldier maintains the security of the area.

The apparatus 300 may report "hits" or target item 100 search results to a tactical controller or to an intelligence tool carried by the user, such as a smartphone application. Fast, automatic detection, location, and identification of target items 100 allows soldiers to be faster and more thorough in their searching. Embodiments therefore enable soldiers to carry out their missions and remove even deliberately hidden items from potentially hostile locations more quickly, safely, and reliably.

Illumination by one or more RF illuminators (including possible simultaneous illumination) may occur across a range waveforms including but not limited to frequencies of 100 MHz to ten GHz for example. The illumination frequency may vary incrementally at a predetermined step rate, such as in ten kHz steps. In addition to the frequency, other waveform parameters such as continuous or pulsed illumination type, repetition rate, duration, and power may be selected. Illumination with each waveform may occur for approximately two seconds for example, but could occur for shorter or longer times depending on the target items 100 and the geometric configuration of the RF illuminators/receivers. If a specific waveform appropriate for the target items 100 is known, then those waveforms may be used instead of a sweep.

Approximately simultaneously with illumination, the receiving antennas may be receiving the FNLE 204 comprising the carrier waveform, sidebands, and other frequencies resulting from penetration by the illumination waveform(s) into the target items 100, non-linear mixing in the target items 100, and re-emission from the target items 100 to the receiver circuit. Depending on the type of target item 100 and the waveform properties, the re-emission may be enhanced by on-device antenna structures to enable reception of the re-emissions 204 from a greater distance than re-emissions from a target item 100 without an antenna. The received re-emission signals 204 may be collected over both a range of frequencies and time. Time may range from sub-millisecond spans to days, for example.

The received signals may be analyzed to extract target item 100 information. Applicable analysis technique examples may include analysis of the re-emission spectrum 204, spectrum variation over time, and calculation of cross-modulation products and/or third-order intermodulation products. From these techniques, various properties of the target items 100 may be assessed, such as state, activity, behavior, physical characteristics, or other observed phenomena. The return spectra may for example also be used to adaptively control the illumination based on the obtained target item 100 information. In an example, the illumination frequency may be changed for forced non-linear responses 204 to avoid interference with normal target item 100 emissions. However, the disclosure is not limited in this respect.

The illuminating energy characteristics may also be changed to shift the forced non-linear responses 204 to avoid interference with particular frequency ranges, or for other reasons. For example, some frequencies may be known to be used by military, intelligence, or security personnel for tactical communications. It is therefore desirable for neither the illuminating energy nor the forced non-linear responses 204 to cause communications problems.

In another example, some frequencies may be used by other security equipment, such as to detect movement within a room or other location. Illuminating energy of a particular frequency may therefore trip an alarm. Similarly, the hostile forces may use known frequency ranges for their own communications. In any case, the transmitting circuitry may configure the illuminating electromagnetic energy by varying at least one of its frequency, power, waveform, directionality, and duration, to minimize interference and/or the possibility of detection.

In one embodiment, the apparatus 300 may determine if the transmitted electromagnetic energy and/or the FNLE 204 are within selected frequency ranges. If so, the apparatus 300 may responsively reconfigure the transmitted electromagnetic energy to shift the illumination and/or the FNLE 204 away from the selected frequency ranges.

Further, processing circuitry configured to control the electromagnetic energy may vary at least one of its frequency, power, waveform, directionality, and duration to avoid affecting data stored in the target item 100. Non-destructive illumination power levels may preserve the intelligence value of seized target items 100. Tests on widely available data storage devices may for example determine the maximum tolerable power density for different illumination frequencies, which may depend on the particular reflective and resonance characteristics of different types of target items 100.

Figure 4:
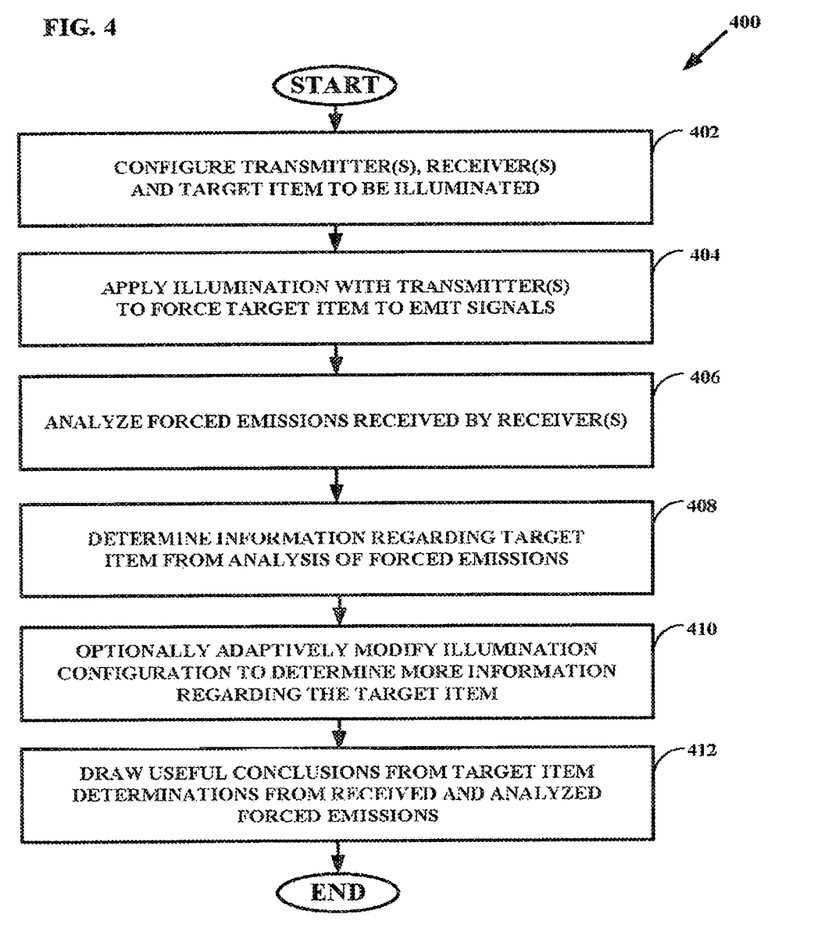
FIG. 4 shows an example of a FNLE method 400 in accordance with some embodiments.

FIG. 4 shows an example of a forced non-linear emission method 400 in accordance with some embodiments. At 402 the method may configure the transmitter circuits, receiver circuits, and the electromagnetic energy to be transmitted to the target item 100. For example, a user may define an output power, frequency range, sweep parameters, etc. to tailor the illumination to a given target item 100. At 404, the method may apply the illumination using the transmitter circuits to force the target item 100 to emit non-linear signals 204 resulting from the mixing of the illumination as previously described.

At 406, the method may receive the FNLE 204 with the receiver circuits and analyze these emissions using a variety of analytical techniques. At 408, the method may determine useful information regarding the target item 100 from the analysis of the FNLE 204. The information may for example describe the state, behavior, and characteristics of the target item 100.

At 410, the method may, optionally, adaptively modify the illumination configuration to determine more information regarding the target item 100. For example, output power, illumination type (continuous or pulsed), and frequency values or sweep ranges may be altered in response to the analysis of previously applied illumination. At 412, the method may draw useful conclusions regarding the target item 100 from the received and analyzed FNLE 204. For example, it may be determined that the target item 100 is active and is processing data, or it may be determined that the target item 100 is currently inoperative.

In one example, the systems and methods described above may enable a rapid validation that the target item 100 is responding in a known way, indicating its physical state is comparable to an original physical state rather than having been modified. Such modification may occur as the target item 100 is subjected to excessive temperatures, mechanical wear, and chemical corrosion for example. During an initialization phase, an illumination/receiving system (also generally termed an FNLE system in this description) may be positioned at a reproducible location in a storage room, warehouse, or vault when target items 100 are in a known (e.g., new) physical state. This may for example be just after the target items are delivered. The FNLE system may illuminate the area and receive the FNLE as previously described. The FNLE system may create and record a "known good set" of results, and save this baseline of the stored target items 100 as a future reference point.

The FNLE system may be placed back into the area and triggered to illuminate the environment and record the forced emissions over a period of perhaps one or two minutes. Note, the storage area may be vacated to improve the reliability of readings and not for health and safety reasons as FNLE system may operate at low power in this scenario. The recorded results may form the test set against which subsequent results may be correlated.

Next, the FNLE system or a separate verification system may perform a comparison of the test set and the known good set. The similarities and differences in the received emissions may be evaluated to determine differences in the target items 100. If these differences are below a threshold, the target items are deemed not to have changed their physical state. The FNLE system may provide the results of the comparison between the nominal characteristics of the target items 100 and their actual characteristics.

In an example, the FNLE system may provide a rapid assessment of the number and types of items in a room. The FNLE system may first individually illuminate and scan a number of items to form a catalog of characteristic results that may form a "reference set". Next, the FNLE system may be placed into a room and activated. The system may initially survey the room to gather observations of radio emissions prior to initializing its transmitter circuits to illuminate the room. The gathered observations may be recorded and form a "baseline set". The FNLE system may then illuminate and scan the room to form an "illumination set". The FNLE system may normalize the illumination set using the baseline set, so that the forced emissions 204 alone may be determined. The difference between the illumination set and the baseline set, due to the forced emissions 204, may form a "test set".

The FNLE system or a separate verification system may then compare the test set against the reference set to potentially recognize known target item 100 types. That is, if a match between the test set and the reference set occurs, that may indicate that a known target item 100 is present. The recognition process may be repeated until all of the FNLE 204 have been matched with a target item 100 that is a member of the test set, or the test set has been exhausted. Remaining unidentified FNLEs may trigger an alert that at least one remaining unidentified target item 100 is present. The disclosure is not limited in this respect, however.

Similarly, a user tasked to find a particular type of target item 100 could employ the embodiments described to recognize and locate all instances of that type item via the analysis and evaluation of the various FNLE 204 from a scan. Suppose for example that the primary target of a search is a high-value currency note or bearer bond or other secure document.

Rather than visually searching an area for such secure documents, which may be small and easily concealable, a user may deploy the apparatus 300 previously described to scan the area. Forced non-linear emissions 204 matching those known to radiate from secure documents may be identified and selected for preferential presentation to the user. A smartphone application for example may indicate the direction and probable or relative range to all detected secure documents based on the analysis and evaluation.

Figure 5:
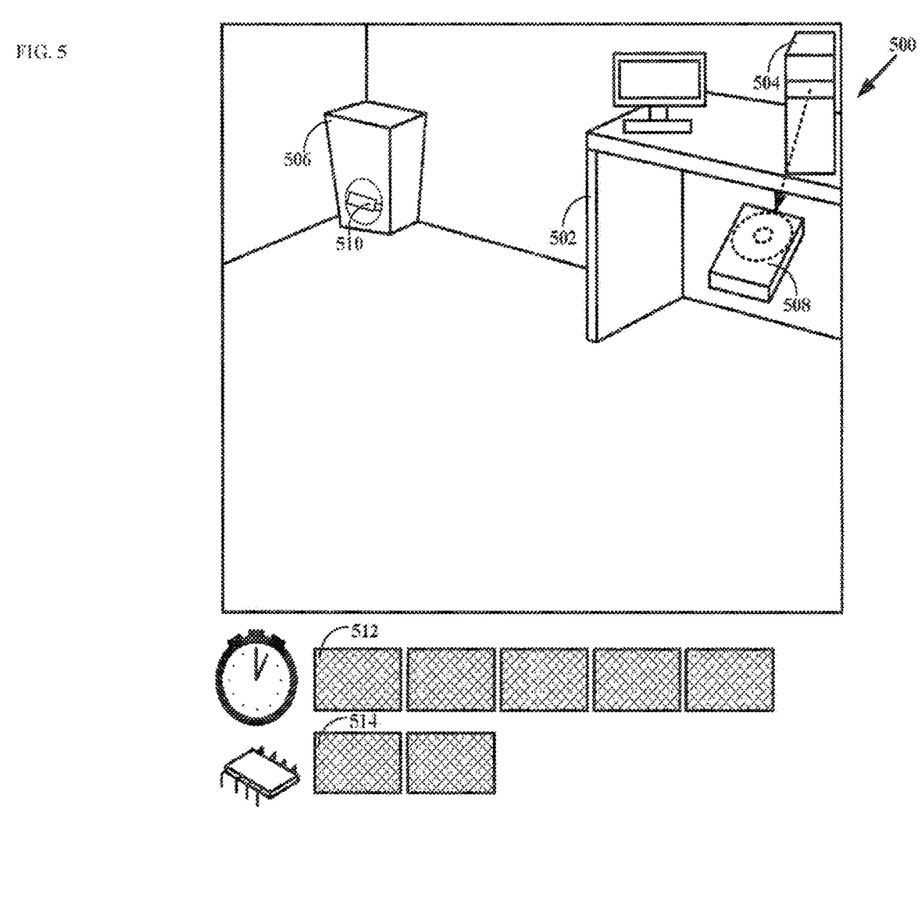
FIG. 5 shows an example of a visually scanned target item search area 500 in accordance with some embodiments.

FIG. 5 shows an example of a visually scanned target item search area 500 in accordance with some embodiments. The search area 500 may comprise a room in a terrorist compound or other area being visually searched by military, security, or intelligence personnel for example. The search area 500 may include a desk 502 with a desktop computer 504 and a garbage can 506.

The searcher may have only a very limited time to conduct a visual search and seize target items 100 likely to be of evidentiary or intelligence value. The searcher may also be responsible for providing security during the search, and thus may only discover and seize target items 100 that are readily recognized and located through a visual search. Such items may comprise a passport 508 taken from a hiding place the desktop computer 502, and a flash memory device 510 hidden in the garbage can 506, for example. The overall time required for the search and the number of items seized are indicated here via icons 512 and 514, respectively.

Figure 6:
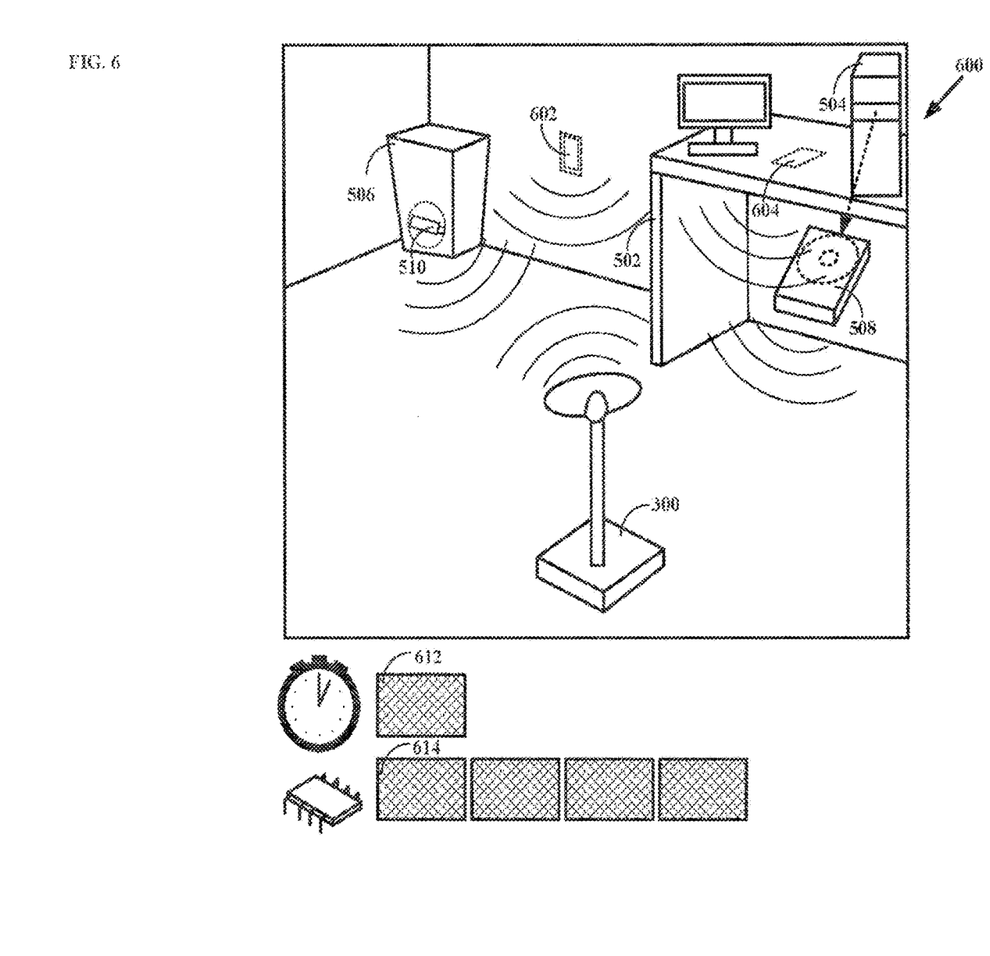
FIG. 6 shows an example of an electromagnetically scanned target item search area 600 in accordance with some embodiments.

FIG. 6 shows an example of an electromagnetically scanned target item search area 600 in accordance with some embodiments. The search area 600 may again comprise a room in a terrorist compound or other area being searched by military, security, or intelligence personnel for example. The search area 600 may again include the desk 502 with the desktop computer 504 and the garbage can 506.

In this example however, the searcher may use the embodiments described to enhance search capabilities beyond the merely visual. The searcher may again have only a very limited time to conduct a search and seize target items 100 likely to be of evidentiary or intelligence value. While target items 100 such as the passport 508 from the desktop computer 502 and the flash memory device 510 were readily discernible in a visual or manual search, other items of interest were not.

Additional target items 100 may be rapidly found by scanning the search area 600 with illuminating electromagnetic energy and analyzing and evaluating the forced non-linear emissions as previously described. For example, the searcher may also detect and locate target items 100 such as currency notes 602 embedded in a wall, and bearer bonds 604 taped to the underside of the desk 502. The overall time required for the search and the number of items seized are indicated here via icons 612 and 614, respectively. The end result may be that more target items 100 may be found in less time.

Figure 7:
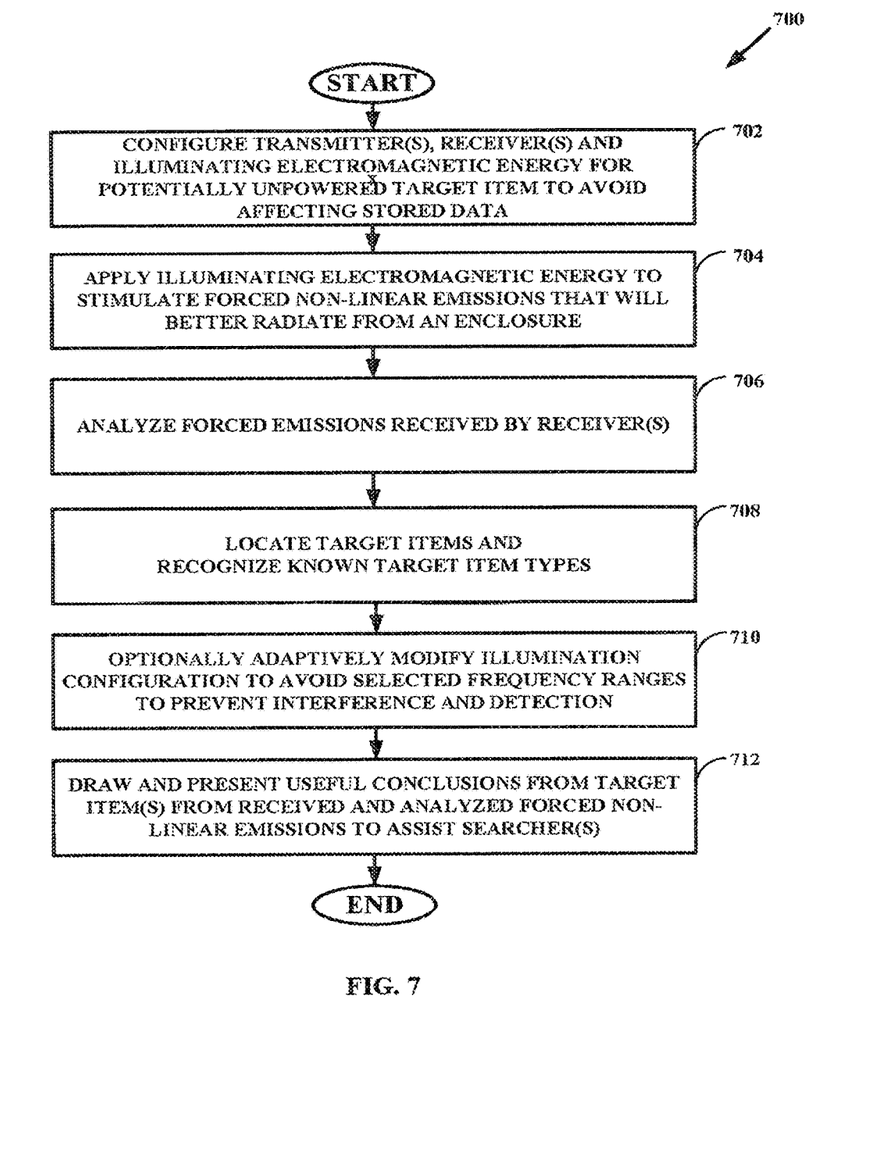
FIG. 7 shows a further example of a FNLE method 700 in accordance with some embodiments.

FIG. 7 shows a further example of a forced non-linear emission method 700 in accordance with some embodiments. At 702 the method may configure the transmitter circuits, receiver circuits, and the electromagnetic energy to be transmitted to the target item 100. For example, a user may define an output power, frequency range, sweep parameters, etc., to tailor the illumination to a given target item 100 so that it will stimulate and mix with electromagnetic signals and resonances in the target item 100. That is, differently configured illumination may be used for unpowered target items 100 that lack operational signals, compared with the illumination of powered target items 100.

The target items 100 may comprise data storage devices, such as a SIM card, a USB memory stick, a flash memory, or an SD card. The illumination may configure the illuminating electromagnetic energy to avoid affecting data stored in the target item 100. For example, the peak power density may be limited to prevent alteration of stored data.

At 704, the method may apply the illumination using the transmitter circuits to force the target item 100 to emit non-linear signals 204 resulting from the mixing of the illumination as previously described. In this example however, the transmitter circuits may control the electromagnetic energy to configure a frequency range of the FNLE 204 to better radiate from an enclosure containing the target item 100. A plurality of transmitters in the transmitter circuitry may be inter-networked to increase the overall target item 100 detection area and the reception of the forced non-linear emissions 204.

At 706, the method may receive the FNLE 204 with the receiver circuits and analyze these emissions using a variety of analytical techniques. At 708, the method may determine useful information regarding the target item 100 from the analysis of the FNLE 204. The information may for example describe the state and probable original manufacturer of the target item 100. Processing circuitry may determine a target item 100 type from among known types by comparing a reference evaluation of a reference item of known type with the in situ evaluation of the target item 100. The processing circuitry may also locate a hidden target item 100 based on the strength and originating direction of the FNLE 204.

At 710, the method may control the electromagnetic energy to keep the electromagnetic energy and the FNLE out of selected frequency ranges. The selected frequency ranges may be those used for tactical communications by search personnel or enemy forces. The selected frequency ranges may also be those used for other security equipment. The method may, optionally, adaptively modify the illumination configuration upon a determination that the electromagnetic energy or the FNLE 204 are within the selected frequency ranges. Processing circuitry may shift the electromagnetic energy and the FNLE 204 away from the selected frequency ranges by responsively reconfiguring the illumination. For example, output power, illumination type (continuous or pulsed), and frequency values or sweep ranges may be dynamically altered in response to the analysis of previously applied illumination.

At 712, the method may draw useful conclusions regarding the target item 100 from the received and analyzed FNLE 204. For example, it may be determined that the target item 100 is active and is processing data, or it may be determined that the target item 100 is currently inoperative as is often the case with non-volatile data storage devices, such as those based on flash memory technologies, or secure documents. The conclusions may be presented to a searcher, for example via a smartphone application, to provide a faster, safer, and more thorough search capability.

In an example, the FNLE 204 may enable detection of counterfeit target items 100. The forced emissions 204 may vary according to the type of target item 100 and its particular components. The FNLE system may therefore illuminate and scan a reference target item 100 that is well characterized as comprising particular subsystems or resonant components, such as security strips or active circuitry running particular software and exchanging particular data, to produce a very particular reference set for comparison. Thus the very specific returned emissions corresponding to a precise set of operational circumstances and hardware may serve as a 'fingerprint' for a particular target item 100 or nearly identical duplicate. If an illuminated and scanned target item 100 does not yield results that match the reference set, then the target item 100 is very probably not the expected device. The disclosure is not limited in this respect, however.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the some embodiments can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

What is claimed is:

1. A software defined radio (SDR) system configured for remote detection and analysis of a target item, the system comprising:
   transmitter circuitry configured to illuminate the target item with radio frequency (RF) or microwave electromagnetic energy, the electromagnetic energy configured to stimulate electromagnetic signals in the target item, the stimulated electromagnetic signals in the target item configured to mix with the transmitted electromagnetic energy to produce forced non-linear emissions that radiate from the target item;
   receiver circuitry configured to receive the forced non-linear emissions from the target item for a subsequent analysis and evaluation; and
   the target item, which includes an unpowered resonant security structure comprising conductive ink that increases the forced non-linear emissions to enhance the detection of the target item and to simplify the subsequent analysis and evaluation.

2. The system of claim 1, further comprising processing circuitry configured to control the electromagnetic energy emitted from a transmitter in the transmitter circuitry, the transmitter configured to control the electromagnetic energy by varying at least one of its frequency, power, waveform, directionality, and duration, to configure a frequency range of the forced non-linear emissions to increase the forced non-linear emissions radiating from an enclosure containing the target item.

3. The system of claim 1, further comprising processing circuitry configured to perform the analysis and evaluation, that determines a target item type from among known types by comparing a reference evaluation of a reference item of known type with an in situ evaluation of the target item.

4. The system of claim 1, wherein the circuitry is portable and battery powered.

5. The system of claim 1, wherein the target item comprises one of a secure document, a secure container, and a security-related item.

6. The system of claim 1, wherein the target item comprises one of a passport, a credit card, a bank check, a gambling chip, a ID badge/cardkey, a smartcard, a deed, a college degree, a software license, a bond, a driver's license, a currency note, a classified report, a confidential report, an artwork, a firearm, a cigarette package, a clothing item, a flash memory device, a computer, a cell phone, an integrated circuit package, a pharmaceutical, and a uniform.

7. The system of claim 1, wherein the security structure comprises one of an embedded structure, a structure attached during manufacture of the target item, a pre-printed structure, a stamped structure, and a manually written structure.

8. The system of claim 1, wherein degradation of the security structure changes the forced non-linear emissions.

9. The system of claim 1, wherein the security structure comprises at least one of a security strip having an electrically conductive portion, a conductive ink pattern, a security hologram, and a barcode structure having both optical and radio frequency/microwave response patterns.

10. The system of claim 1, wherein the security structure is not fully visually apparent.

11. A method of remotely detecting and analyzing a target item, the method comprising:
   illuminating the target item using transmitter circuitry that outputs configured radio frequency (RF) or microwave electromagnetic energy that stimulates electromagnetic signals in the target item, the stimulated electromagnetic signals in the target item configured to mix with the transmitted electromagnetic energy to produce forced non-linear emissions that radiate from the target item; and
   receiving the forced non-linear emissions from the target item using receiver circuitry for a subsequent analysis and evaluation,
   wherein the target item includes an unpowered resonant security structure comprising conductive ink that increases the forced non-linear emissions to enhance the detection of the target item and to simplify the subsequent analysis and evaluation.

12. The method of claim 11, further comprising one of previously embedding the security structure, previously attaching the security structure, previously printing the security structure, stamping the security structure, and manually writing the security structure.

13. The method of claim 11, further comprising changing the forced non-linear emissions by degrading the security structure.

14. The method of claim 11, further comprising analyzing the forced non-linear emissions and other security features of the target item together to authenticate the target item.

15. The method of claim 11, further comprising determining a target item type from among known types by comparing a reference evaluation of a reference item of known type with an in situ evaluation of the target item.

16. A non-transitory computer-readable storage medium that stores instructions for execution by processing circuitry of a software defined radio (SDR) system that remotely detects and analyzes a target item, to configure the SDR to:
   illuminate the target item using transmitter circuitry that outputs configured radio frequency (RF) or microwave electromagnetic energy that stimulates electromagnetic signals in the target item, the stimulated electromagnetic signals in the target item configured to mix with the transmitted electromagnetic energy to produce forced non-linear emissions that radiate from the target item; and receive the forced non-linear emissions from the target item using receiver circuitry for a subsequent analysis and evaluation, wherein the target item includes an unpowered resonant security structure comprising conductive ink that increases the forced non-linear emissions to enhance the detection of the target item and to simplify the subsequent analysis and evaluation.

17. The medium of claim 16, further comprising instructions for requesting one of stamping the security structure and manually writing the security structure.

18. The medium of claim 16, further comprising instructions for changing the forced non-linear emissions by degrading the security structure.

19. The medium of claim 16, further comprising instructions for analyzing the forced non-linear emissions and other security features of the target item together to authenticate the target item.

20. The medium of claim 16, further comprising instructions for determining a target item type from among known types by comparing a reference evaluation of a reference item of known type with an in situ evaluation of the target item.

\* \* \* \* \*

UNITED STATES PATENT AND TRADEMARK OFFICE
CERTIFICATE OF CORRECTION

PATENT NO. : 10,121,294 B1
APPLICATION NO. : 15/676518
DATED : November 6, 2018
INVENTOR(S) : Dishon et al.

Page 1 of 1

It is certified that error appears in the above-identified patent and that said Letters Patent is hereby corrected as shown below:

In the Specification

In Column 1, Line 13, before "applications,", insert --pending--

In Column 2, Line 43, delete "reemission" and insert --re-emission-- therefor

In Column 12, Line 33, delete "502," and insert --504,-- therefor

In Column 12, Line 50, delete "502" and insert --504-- therefor

Signed and Sealed this
Twenty-fourth Day of March, 2020

Andrei Iancu
*Director of the United States Patent and Trademark Office*